United States Patent
Hansen et al.

(10) Patent No.: US 9,600,706 B2
(45) Date of Patent: Mar. 21, 2017

(54) ACQUISITION OF A FINGERPRINT IMAGE

(71) Applicant: Fingerprint Cards AB, Göteborg (SE)

(72) Inventors: Morten Hansen, Vanløse (DK);
Fredrik Ramberg, Göteborg (SE);
Hans Thörnblom, Kungsbacka (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/188,473

(22) Filed: Jun. 21, 2016

(65) Prior Publication Data
US 2017/0032165 A1    Feb. 2, 2017

(30) Foreign Application Priority Data

Jul. 29, 2015  (SE) ...................................... 1551049

(51) Int. Cl.
*G06K 9/00* (2006.01)

(52) U.S. Cl.
CPC ....... *G06K 9/0002* (2013.01); *G06K 9/00067* (2013.01)

(58) Field of Classification Search
CPC ............. G06K 9/00013; G06K 9/0002; G06K 9/00067; G06K 9/00919; G06K 9/20; G06F 21/32; G06F 21/33; G06F 21/34; G06F 2211/008; G06Q 20/341; G06Q 20/40145

See application file for complete search history.

(56) References Cited

U.S. PATENT DOCUMENTS

| 6,289,114 B1 * | 9/2001 | Mainguet ........... G06K 9/00026 382/124 |
| 2001/0040987 A1 | 11/2001 | Bjorn et al. |
| 2007/0206113 A1 * | 9/2007 | Nakamura ......... G06K 9/00013 348/362 |

(Continued)

FOREIGN PATENT DOCUMENTS

| WO | 9927485 A2 | 6/1999 |
| WO | 0007115 A1 | 2/2000 |

OTHER PUBLICATIONS

International Search Report and Written Opinion for International Application No. PCT/SE2016/050646 mailed Oct. 19, 2016, 13 pages.

(Continued)

*Primary Examiner* — Bhavesh Mehta
*Assistant Examiner* — Ian Lemieux
(74) *Attorney, Agent, or Firm* — Remarck Law Group PLC

(57) ABSTRACT

An apparatus and a computer-implemented method of acquiring a fingerprint image from a fingerprint sensor with an array of sensor elements spanning a sensing area, comprising: monitoring groups of sensor elements located at group-wise spaced apart positions in the array of sensor elements, to determine a touch event occurring on the array of sensor elements; from the array of sensor elements, acquiring, at respective points in time, fingerprint sub-images which are confined in size to a subarea of the sensing area; as the fingerprint sub-images are acquired, computing values of a statistical indicator for the fingerprint sub-images; and acquiring a full fingerprint image when a predefined criterion indicates that the values of the statistical indicator has reached or is about to reach a stable state.

15 Claims, 8 Drawing Sheets

(56) References Cited

U.S. PATENT DOCUMENTS

| | | | |
|---|---|---|---|
| 2008/0205714 A1* | 8/2008 | Benkley | G06F 3/03547 382/126 |
| 2015/0070137 A1 | 3/2015 | Minteer et al. | |
| 2015/0178542 A1 | 6/2015 | Minteer et al. | |

OTHER PUBLICATIONS

Fridrich, J., "Digital Image Forensics", IEEE Signal Processing Magazine, Mar. 2009 (12 pages).
Nielsen, F., "A family of statistical symmetric divergences based on Jensen's inequality", arXiv:1009.4004., Dec. 2011 (15 pages).

* cited by examiner

ACQUISITION OF A FINGERPRINT IMAGE

CROSS REFERENCE TO RELATED APPLICATIONS

This application claims the benefit of Swedish Patent Application No. 1551049-8 filed Jul. 29, 2015. The disclosure of the above application is incorporated herein by reference in its entirety.

BACKGROUND

There is a general assumption that every individual has a unique fingerprint from which they can be uniquely identified. The skin of an individual's finger forms patterns of ridges and valleys that leave a print on a surface when touched. The print can be sensed by a fingerprint sensor, such as a capacitive sensor, that can generate an image of the pattern of ridges and valleys, in response to the fingerprint sensor being touched to thereby represent the fingerprint electronically in a computer-readable format.

There is a general assumption that every individual has a unique fingerprint from which they can be uniquely identified. The skin of an individual's finger forms patterns of ridges and valleys that leave a print on a surface when touched. The print can be sensed by a fingerprint sensor, such as a capacitive sensor, that can generate an image of the pattern of ridges and valleys, in response to the fingerprint sensor being touched to thereby represent the fingerprint electronically in a computer-readable format.

Authentication of an individual from a fingerprint is the process of comparing at least two instances of fingerprints (skin impressions) acquired by a fingerprint sensor to determine whether these impressions are likely to come from the same individual. As fingerprint sensing and processing technology gradually produce more and more reliable verification and as more advanced processing means become available in electronic devices fingerprint based authentication becomes more widely used—e.g. in connection with access control, authentication, for gaining access to a smart phone. In connection therewith, and in general, there is a demand for very fast acquisition of a fingerprint image and processing thereof. However, for fingerprint sensors—at least those of the capacitive type—it takes a significant amount of time to acquire a fingerprint image.

When it comes to the timing of the acquisition, also denoted capture, then there are basically two things that should be avoided, namely a too early or too late capture. A too early image capture can result in images where the finger is not yet put properly on the touch sensor, while a too late capture can lead to images where the finger is leaving the sensor or where sweat from the finger starts to spread in the valleys. This implies that there is only a limited time interval in which it is feasible to acquire a good fingerprint image.

It should also be noted that the total time it takes until a full fingerprint image is acquired and verification processes are completed is usually an important performance indicator.

US 2015/070137 discloses a fingerprint sensor of the capacitive type which comprises an array of finger sensing pixels and processing circuitry coupled to the array of sensing pixels. The processing circuitry is capable of acquiring finger stability data from a subset of the sensing pixels scattered across the fingerprint sensor, and determining whether a finger is stable relative to the array off sensing pixels based upon finger stability data. The processing circuitry is also capable of acquiring fingerprint images from the array of finger sensing pixels when the finger is determined to be stable.

However, this fingerprint sensor is configured in hardware and provides only limited information for deciding when to acquire a full fingerprint image, which in turn involves the risk of acquiring a fingerprint image that is acquired too early, before the finger is actually stable and before sufficient image information is available or too late, when the finger has left the sensor and the moment for acquiring an image with sufficient image information is missed. In either events re-activation of a user to touch the sensor again are needed, if possible, to obtain sufficient information in the fingerprint image.

SUMMARY

There is provided a method for determining the right point in time for capturing a fingerprint image using capacitive sensing technology. In some aspects the method both tracks the spatio-temporal evolution of the signal level of the fingerprint sensor and it simultaneously therewith ensures that the signal is kept within a specified range. The spatial-temporal sensing can among others be used as an enabler for a fast image capture of as much fingerprint information as possible.

In the below, the term 'touch' is used to designate a touch of a sensor. A touch is interchangeably also denoted a 'touch event'.

There is provided a method of acquiring a fingerprint image from a fingerprint sensor with an array of sensor elements spanning a sensing area, comprising:

monitoring groups of sensor elements located at group-wise spaced apart positions in the array of sensor elements, to determine the location of a touch occurring on the array of sensor elements;

from the array of sensor elements, acquiring, at respective points in time, fingerprint sub-images which are confined in size to a subarea of the sensing area; wherein one or more of the sub-images is/are selected from a location about the location of the touch;

as the fingerprint sub-images are acquired, computing values of a statistical indicator for the fingerprint sub-images;

acquiring a full fingerprint image when a predefined criterion indicates that the values of the statistical indicator has reached or is about to reach a stable state.

Consequently, the right point in time for acquiring a full fingerprint image can be estimated with high accuracy since a sub-image can be acquired at a fraction of the time it takes to acquire a full image and carries information representing—or being indicative of—the quality of a full fingerprint image fairly well.

Since the time it takes from a touch event is initially detected until conditions for recording a useful fingerprint image have settled and become stable, varies significantly from one touch of the sensor to another and since it takes a significant amount of time to acquire a full fingerprint image, there is a risk that the fingerprint image is recorded too early or that the point in time for recording a fingerprint image from a touch is missed. In either events re-activation of a user to touch the sensor again are needed to obtain sufficient information in the fingerprint image. It should be noted that conditions for recording a useful fingerprint image greatly depends on the wetness or humidity of the finger and the speed and duration of the finger movement immediately before, during and after the touch since the fingerprint image typically is obtained from a capacitive sensing principle.

A significant advantage is that the fingerprint acquisition can be controlled from a software application, which allows great flexibility in customizing the image acquisition e.g. in connection with adaptive control as described further below e.g. for "on the fly" adjustment of gain level in order to prevent saturation.

Thus, estimation of a stable condition is performed by computationally following the evolution of the sub-images at different points in time. The time it takes until the conditions for recording a useful fingerprint image are sufficiently stable may range from about 30 milliseconds to about 300 milliseconds, up to about 500 milliseconds. In comparison it may take in the range of about 10 milliseconds to about 100 milliseconds, up to about 175 milliseconds to acquire a full fingerprint image from the fingerprint sensor. The time it takes to acquire or capture a full image may depend on the configuration of the fingerprint sensor, a clock frequency of the Serial Peripheral Interface, a configuration of software performing image acquisition from the fingerprint sensor and other factors.

A fingerprint sub-image is stored only temporarily and is typically discarded when a subsequent sub-image is acquired or when one or more statistical indicators have been computed from the sub-image.

Some fingerprint image sensors come with an interface for quickly reading out information for monitoring the groups of sensor elements. The groups, also denoted pads, may be located at spaced apart positions scattered across the array of sensor elements e.g. as groups comprising a matrix of 8-by-8 sensor elements, wherein the sensor elements in the group is coupled to a circuit that outputs a binary signal indicating where the group is touched or not. Such a binary signal can be generated quickly and at fast rates. The groups of sensor elements may be predefined groups of sensor elements defined in a hardware configuration of the fingerprint sensor.

Thus the spatio-temporal evolution of a touch can be followed while the touch is occurring to determine the location of a touch event occurring on the array of sensor elements. In some aspects the location of a touch event is determined and used to determine at which location in the array of sensors to acquire the fingerprint sub-images, before the sub-image is acquired from that location.

By confined in size to a subarea of the sensing area is meant that a sub-image is selected to be smaller in size than a full fingerprint image. A sub-image may have rectangular, square, round or another shape. The size of a sub-image may be selected applying a trade-off between more frequent acquisition and smaller size or less frequent acquisition and larger size. The size may be e.g. about 1-2%, 1-5%, less than or about 10%, 20%, 30%, 40%, or 50% of the size of a full fingerprint image. A full fingerprint image may cover all sensor elements of the image sensor or a majority thereof, e.g. not including image sensor elements covered by a rim or framing or sensor elements considered 'dead' since they have degraded.

In some aspects, one or more of the sub-images are selected by acquiring a sub-image at a resolution that is lower than the (native) resolution given by the number of sensor elements per unit area; for instance by reading out intensity values from selected rows and columns, e.g. by reading out from every $2^{nd}$, or $4^{th}$, or $8^{th}$ row and column and skipping read-out from sensor elements located in between. In some aspects the number of rows skipped is the same as the number of columns skipped; in other aspects the number of rows skipped is different from the number of columns skipped. In some aspects, one or more of the sub-images may be selected as groups of sensor elements located at group-wise spaced apart positions in the array of sensor elements. These aspects have the advantage the statistical indicator can be computed from a relatively small number of intensity values, while the sub-image may cover a relative large area although it is sparsely sampled.

Values of a statistical indicator for the fingerprint sub-images are computed as the fingerprint sub-images are acquired in order to follow the evolution of the values and take action to acquire the full image as soon as the statistical indicator has reached or is about to reach a stable state. Statistical indicators are described in more detail below and may e.g. be a mean value computed from a sub-image.

In some embodiments the location of a touch is estimated from those groups of sensor elements that indicate a touch, at a point in time, when at least a threshold number of groups of sensor elements indicates that the touch event is occurring.

Thereby the location of a touch is determined after a threshold number of groups of sensor elements (also denoted pads) indicate that the touch event is occurring. Thereby a more reliable estimation of the location is achieved. In some aspects, the threshold number of pads of sensor elements is more than half of the predefined pads or more than about 30% of the pads, or more than 40%, or more than 60%.

In some aspects the onset of a touch is detected, e.g. from a signal generated from a hardware circuit of the fingerprint sensor, and starts a predefined time period that runs for a predefined period of time; and wherein the subset of groups of sensor elements is determined when the predefined time period runs out.

In some aspects a touch is detected when one or more, but less than the threshold number of groups of sensor elements indicates that the touch is occurring.

The location of the touch event may be determined by identifying the groups of sensor elements—also denoted pads—that respond to a touch (with predefined information on their location) among the groups being monitored. By the term 'respond to a touch' is understood that the capacity measured by one or more of the sensor elements within a pad e.g. exceeds a threshold value.

The location of the touch event may be computed as a geometrical centre of the groups of sensor elements. In some aspects the geometrical centre is the geometrical centre of gravity or an approximation thereof.

In some aspects the step of monitoring the groups of sensor elements is performed in a low-power mode, e.g. a sleep mode, and when at least the threshold number indicates that the touch is occurring, the sleep mode is leaved to only then determine the location of the touch. Thereby, the risk of needlessly exiting the low-power mode due to spurious activations is reduced.

Once the threshold number of groups of sensor elements responds to a touch event, acquisition of the fingerprint sub-images commences. In some aspects the fingerprint sub-images are then acquired from the same location in the array of sensor elements. In some aspects the fingerprint sub-images acquired at different points in time have a similar size, e.g. the same size.

In some embodiments the one or more of the sub-images is/are selected from a region confined in expanse to be within a bounding box enclosing the groups of sensor elements that indicates that the touch event is occurring.

Thereby the one or more sub-images can be spatially arranged where the touch occurs so as to improve the likelihood of acquiring image information representing the quality of an about-to-be-acquired full fingerprint image.

By determining the location of a touch occurring on the array of sensor elements is understood that the method may use information on the distance between the pads (i.e. the groups of sensor elements). Information on the distance may be stored as a number of pixels e.g. by a number of pixels between the pads or from the centre of a pad to the centre of a neighbouring pad. The pads may be spaced apart by a regular or irregular distances and may be the same or different along rows and columns in the array. Thus, by combining stored information on the geometrical relation of and between the pads and information on which ones that are activated, the region of the sub-image can be selected to be confined in expanse to be within a bounding box surrounding the groups of sensor elements that indicates that the touch event is occurring. The bounding box may have a square shape or a polygon shape. The bounding box may enclose all the activated pads or the bounding box may pass through or immediately within a region set by the outermost pads of a cluster of activated pads. For example, in case there are 32 rows or columns of pixels between pads and in case the activated pads are located at corners of an imaginary square, then a sub-image confined to a region of $(32+2P) \times (32+2P)$ sensor elements can be acquired, wherein P is a dimension of the pad.

Thus, signal evolution is measured in the particular region where the finger actually touches the sensor and is tracked by means of the statistical indicators.

This gives both of a more reliable prediction on the point in time when the finger is stable because the tracking is performed in the area where the finger is actually present, and furthermore, it will also keep the computational complexity at a relatively low level since the processing is confined to image data obtained for that specific area. A low computational complexity has the benefit that it can be an enabler for a fast sensing approach with low power consumption.

In some embodiments the step of monitoring a set of groups of sensor elements, continues while the fingerprint sub-images are acquired to dynamically determine the sub-set of groups of sensor elements, and therefrom dynamically relocate from which sensor elements the preliminary fingerprint sub-images are acquired.

This is advantageous when the fingertip slightly rolls over the sensor and effectively changes the location and expanse of the touch. However, by relocating the individual sub-images e.g. one-by-more the likelihood of acquiring information that represents the quality of an about-to-be-acquired full fingerprint image is improved in such events, while processing only image information from a sub-image area.

In some embodiments the method comprises: evaluating the slope of the values of the statistical indicator over time as the values are computed; wherein the predefined criterion indicates that the values of the statistical indicator has reached or is about to reach a stable state when the slope is below a predefined slope threshold.

When the intensity change is close to zero, it indicates that the finger is close to find its steady state mode, and thus, the finger will most likely be stable. Some examples of metrics that can be used for tracking intensity changes are minimum/maximum values and/or mean/median values. By tracking such values, the steepness of a curve and thus the slope of the intensity change can be computed, and this can be used as for finding the steady state i.e. when the slope decreases and flattens out.

The time elapsed between the acquisition of two consecutive sub-images may be taken into account for computing the slope since sub-images may be acquired at varying time intervals.

It should be noted that in some aspects the predefined criterion for being in a stable state is that values of one or more of the statistical indicators has been within the slope threshold over multiple of the respective points in time before the finger is classified as stable.

When it comes to ensuring that the image is captured with the right signal strength, it is beneficial to perform an adaptive control of the signal level in the fingerprint sensor. The adaptive control of the signal should ideally be made during each touch of the sensors to take into account both the pressure of finger and the current capture environment e.g. humidity and noise.

There are several benefits of simultaneously tracking multiple intensity metrics, such as minimum, maximum, and mean values, since this will first of all improve the reliability of estimation of the steady state. Secondly, the tracking of the minimum and maximum values will at the same time also provide an indication of dynamic range of the input signal, and thus, the fingerprint system can simultaneously adjust the signal amplification on-the-fly in order to avoid signal saturation.

In some embodiments the method comprises: adaptively performing an adjustment of a setting of the fingerprint sensor in response to values of an intensity measure computed from at least one of the fingerprint sub-images.

It has been observed that there is a tendency that humidity or wetness accumulates in the valleys, between ridges, of the skin of the finger. This causes not only ridges, but also valleys in which wetness or humidity is accumulated to induce strong signal levels to the sensor elements. Conventionally, this involves the risk that, contrast in the fingerprint image largely vanishes, which degrades the quality of the fingerprint image and potentially prevent fingerprint verification and authorisation. Also, there is a risk that relatively high levels of humidity or wetness of the finger touching the fingerprint sensor quickly, and before the full fingerprint image is acquired, causes saturation of one or both of the sensor elements and the circuitry coupled thereto.

However, the adaptive adjustment of a setting of the fingerprint sensor in response to an intensity measure of at least one of the preliminary fingerprint sub-images may counteract such degradation of the contrast in the acquired full fingerprint image. Thereby the dynamic range of the fingerprint sensor can be effectively used such that improved verification can be achieved.

In some aspects there is performed at least one adaptive adjustment during a touch event.

Another embodiment of the invention is to track the full intensity distribution, and in such an embodiment, the steady state mode can be estimated by using the divergence of the intensity distribution as a metric e.g. the total variation distance or the Kullback-Leibler divergence or the Jensen-Shannon divergence. It is well known in the machine learning community that tracking of the full density distribution/function will often provide a more comprehensive and reliable estimate than a simple "point estimate".

In some embodiments the method comprises: evaluating the values of one or both of the statistical indicator and a further statistical indicator over time, as the values are computed, against an intensity threshold; and when one or more of the values of one or both of the statistical indicator and a further statistical indicator exceed the intensity threshold, performing an adjustment of a setting of the fingerprint sensor.

Consequently, the setting of the fingerprint sensor is adjusted during the process of acquiring the preliminary fingerprint sub-images.

In some aspects, wherein higher electrical capacity is represented by lower intensity values and vice versa, the intensity measure is an estimate of the lower quantile or lower 10% percentile in a distribution of intensity values collected from respective ones of the preliminary fingerprint sub-images. Other percentiles may be 2%, 5%, 15% or 20%. By using a quantile or percentile as the intensity measure it is possible increase the robustness to impairments such as dead pixels and/or noise. Furthermore, this will also be beneficial in cases where a portion of the sub-image does not contain any signal from the fingerprint. Thus, there can be situation where percentiles can lead to a more meaningful minimum value of the distribution of intensity values.

In some embodiments the setting of the fingerprint sensor is adjusted by changing a gain setting in the fingerprint sensor.

Conventional fingerprint sensors comprise a mixed-mode analogue/digital circuitry section with a signal path leading from a sensor element, such as a sensor element that can be electrically charged, to an analogue-to-digital converter section which outputs a digital signal to a digital section with a digital signal path carrying a digital fingerprint image signal to an interface provided at one or more electrical terminals. Usually a control interface is provided, e.g. a so-called serial programmable interface, SPI, through which the signal path can be operatively controlled or routed to thereby change the setting.

In some aspect the setting of the fingerprint sensor is adjusted by changing the signal path in the mixed-mode analogue/digital circuitry section.

In some embodiments the setting of the fingerprint sensor is adjusted by changing a shift setting in the fingerprint sensor.

The shift may be one or more of a digital offset or a DC voltage shift or a DC current shift. The DC voltage shift or a DC current shift may be set in an analogue or mixed-mode domain of the fingerprint sensor. The shift may also or alternatively be set in an analogue-to-digital converter of the fingerprint sensor.

In some embodiments one or both of the statistical indicator and the further statistical indicator is/are selected from the group of: a percentile or quantile of the distribution of intensity values; a median value, a mean value, a total variation distance, and a divergence measure, such as an asymmetrical or symmetrical divergence measure of the distribution relative to a predefined distribution.

Most of these statistical indicators can be implemented with relatively simple processing. The divergence measure may be a so-called Kullback-Leibler divergence measure as originally introduced by Solomon Kullback and Richard Leibler or the divergence measure may be the so-called Jensen-Shannon divergence measure or another divergence measure. Computing of a divergence measure is based on at least two distributions which may be distributions of intensity values from two consecutive sub-images.

As mentioned above, in some embodiments, the method comprises evaluating the slope of the values of the statistical indicator over time; wherein the predefined criterion indicates that the values of the statistical indicator has reached or is about to reach a stable state when the slope is below a predefined slope threshold.

As mentioned above, the right point in time for acquiring a full fingerprint image can be estimated with high accuracy. However, since the finger may be moved, turned or even removed from the sensor during the period it takes until a full fingerprint image is acquired, there is a risk that the full fingerprint image, albeit being complete, has a quality that is insufficient for authorization purposes. It may take substantial time to reach this conclusion by conventional methods—and may involve the risk of rejecting a fingerprint from a rightful person as being un-authorised. Therefore:

In some embodiments the method comprises:

before or upon start of acquisition of a full fingerprint image determining a first set of groups of sensor elements that indicate a touch;

upon completion of acquisition of a full fingerprint image or at a point in time when the full fingerprint image is acquired, determining a second set of groups of sensor elements that indicate a touch;

comparing the first set of groups of sensor elements and the second set of groups of sensor elements; and assigning a value to the full fingerprint image, wherein the value indicates an outcome of comparing the first set and the second set.

Consequently, an efficient way of performing quality control of the acquired full fingerprint image is provided. The quality control relies on determining the spatial expanse of the touch before and after the fingerprint image is acquired or at the beginning and upon completion of the acquisition—or a combination thereof. As mentioned above, the fingerprint sensor may be configured to provide a very fast read-out of values indicating whether a pad or group of sensor elements is touched or not e.g. as a binary signal. Thus, the quality control can be performed in a fast way to quickly prompt the user to try again, in case the fingerprint image is of inferior quality.

In some aspects, in case the second set fails to comprise all or substantially all groups in the first set, the value assigned to the fingerprint image is set to indicate that the quality of the fingerprint image is inferior. In case the second set comprise all or substantially all or additional groups than the groups in the first set, the value assigned to the fingerprint image is set to indicate that the quality of the fingerprint image is approved.

In some aspects the first set of groups of sensor elements is determined in connection with the above-mentioned step of determining the location of a touch occurring on the array of sensor elements i.e. before or in between acquisition of sub-images. In other aspects the first set of groups of sensor elements is determined immediately before or at the beginning of the acquisition of a full image. In the latter case, the basis for comparing the first set and the second set is improved since the sets are determined respectively right before and after a full image is acquired.

There is also provided a computer system loaded with a computer program configured to perform the above method.

There is also provided a computer-readable medium carrying a program configured to perform the above method when the method is a computer-implemented method run on a computer.

There is also provided an apparatus configured to acquire a fingerprint image from a fingerprint sensor with an array of sensor elements spanning a sensing area, comprising: a monitoring component configured to monitor groups of sensor elements located at group-wise spaced apart positions in the array of sensor elements, to determine the location of a touch occurring on the array of sensor elements; an image acquisition component configured to acquire, at respective points in time, fingerprint sub-images which are confined in size to a subarea of the sensing area; wherein one or more of the sub-images is/are selected from a location about the location of the touch; a computing component configured to compute values of a statistical indicator for the fingerprint sub-images as the fingerprint sub-images are acquired; wherein the image acquisition component is further configured to acquire a full fingerprint image when a predefined criterion indicates that the values of the statistical indicator has reached or is about to reach a stable state.

In some embodiments the apparatus is one of a mobile phone, a smart phone, a tablet computer, a laptop computer and a general purpose computer. In some embodiments the apparatus comprises the fingerprint sensor.

Here and in the following, the terms 'computer', 'processor', 'processing means' and 'processing unit' are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

BRIEF DESCRIPTION OF THE DRAWINGS

A more detailed description follows below with reference to the drawing, in which.

DETAILED DESCRIPTION OF EXAMPLE EMBODIMENTS

Figure 1:
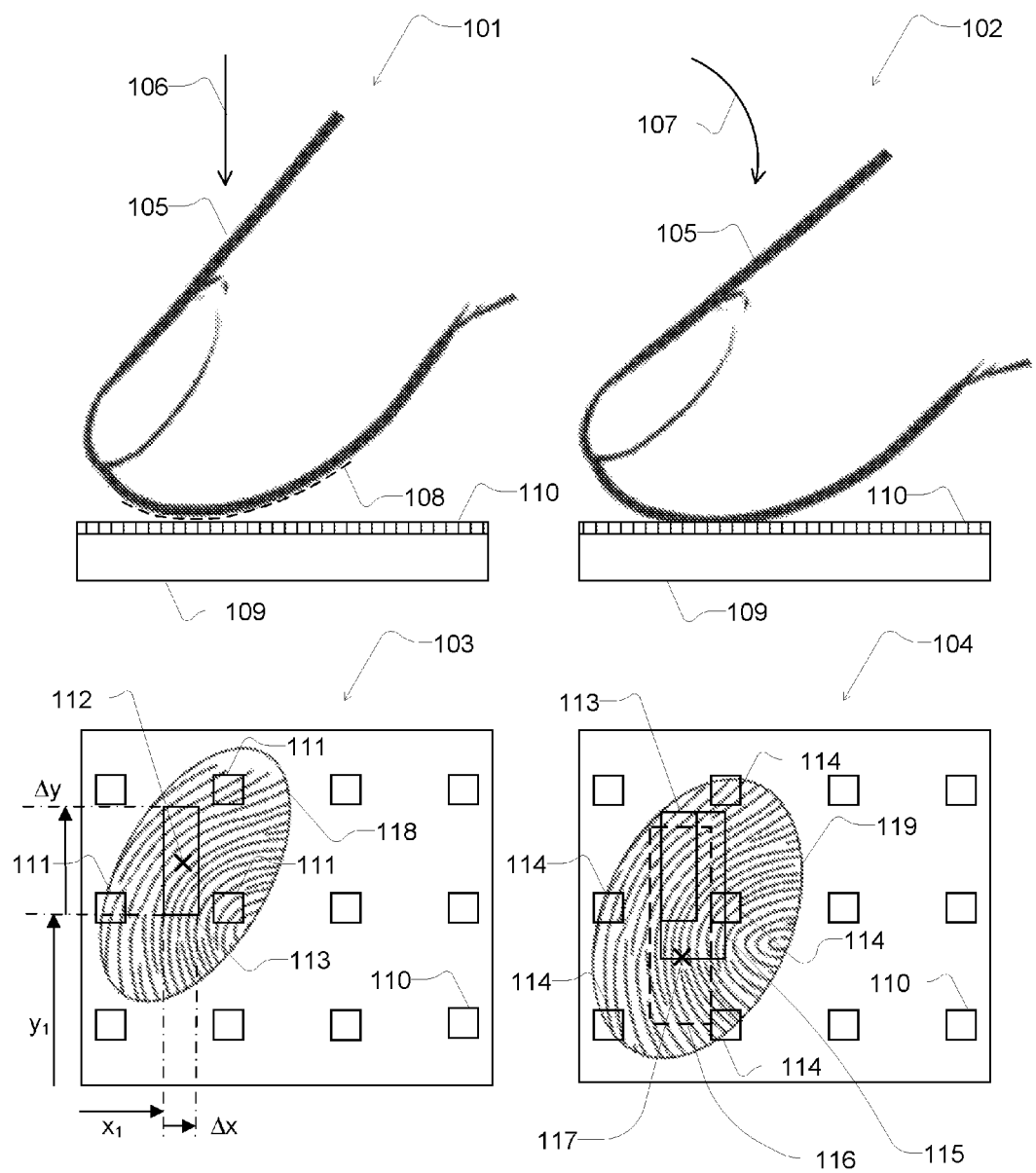
FIG. 1 shows a side-view of a fingerprint sensor being exposed to a finger touching the sensor and a top-view of the fingerprint sensor showing sensor pads and sub-image configurations.

FIG. 1 shows a side-view of a fingerprint sensor being exposed to a finger touching the sensor and a top-view of the fingerprint sensor showing sensor pads and sub-image configurations. A more detailed description is given subsequently in connection with a flowchart.

The fingerprint sensor is generally designated by reference numeral 109 and the finger is generally designated by reference numeral 105. Topmost, on the left hand side 101 it is shown a side-view where the finger 105 is moved downwards as shown by arrow 106 until it touches the sensor. Then on the right hand side 102 it is shown that the finger 105 continues to move as shown by arrow 107.

The fingerprint sensor 109 may be of the capacitive type that by means of sensing elements arranged as elements in a matrix array commonly designated 110 senses the capacity between the finger and the sensor. The sensing elements have a sufficiently small size and are arranged sufficiently close to provide capacitive imaging of the ridges and valleys of the finger's skin. Conventionally, the sensing elements are protected behind a covering non-conductive layer (not shown). Due to the capacitive imaging technique moist and humidity, as illustrated by dashed line 108, greatly influence the nature and quality of the fingerprint image that can be acquired from the sensor. Moist or humidity may cause a 'flooding' of the valleys with the undesired effect that a fingerprint image becomes somewhat distorted and potentially there is a risk that the circuities of the sensor elements saturate. Other undesired effects from high or very low levels of humidity may occur as well. An adaptive method to circumvent this risk is disclosed further below.

Bottommost, are shown two top-views of the sensor 109 with an overlay of respective fingerprints caused by the above evolution of a touch on the sensor. By comparing the leftmost fingerprint 118 and the rightmost fingerprint 119 it can be seen that the rightmost one is slightly bigger and has moved a bit.

The individual sensor elements—also denoted pixels—of the sensor is not shown in this top-view, but groups 110, 111 and 114 of sensor elements located at group-wise spaced apart positions in the array of sensor elements are shown. Each group 110, 111 and 114 may comprise one or more sensor elements e.g. groups of 2-by-2 sensor elements, 8-by-8 sensor elements or other configurations. The groups may have the same size and shape or may have different sizes and/or shapes. The groups of sensor elements are also denoted 'pads'.

The sensor elements (not shown) are coupled to respective signal paths for reading out intensity values in analogue and/or digital form such that capacitive imaging is provided as it is known in the art.

In some embodiments the pads comprise sensor elements that are additionally coupled to a second signal path for reading out sensed values in a fast way e.g. in a binary form. Thereby signals from the pads can be quickly captured. In other embodiments the pads comprise one or more dedicated sensor elements which may have a larger size or a size similar to other sensor elements.

On the left hand side, the groups of sensor elements designated 111 are activated by the finger 105 and output e.g. a binary '1'. The groups of sensor elements designated 110 represents groups that are not activated by the touch. Knowing the layout of the groups, e.g. by pixel coordinates, a geometrical centre of the groups being activated can be computed to determine the location 112 of the touch occurring on the array of sensor elements. About the position 112 of the touch a sub-image which is confined in size to a subarea 113 of the sensing area can be selected for fast read-out since it is limited in size. In general, the sensing area is the area the sensing elements cover collectively. It is shown that the subarea 113 is located at coordinates $(X_1, Y_1)$ and has a dimension $\Delta X, \Delta Y$.

In some embodiments the sub-image is recorded from multiple spaced apart regions within the sub-area 113, wherein intensity values between the spaced apart regions are not read out or disregarded for processing of the sub-image. The spaced apart regions may be arranged as a chessboard pattern, in which case corners of the regions may be adjacent or overlap marginally. Alternatively, the spaced apart regions within the sub-area 113 may be configured as row-oriented or column-oriented bands.

In some embodiments the location 112 of the touch takes the form of a vector, wherein its elements hold respective values representing the location of respective groups of sensor elements designated 111 that are activated by the finger 105. In that case the computation of the location 112 may be dispensed with since the multiplicity of locations may be readily available. The sub-image may be recorded from multiple spaced apart regions each being located about the location of the respective groups of sensor elements 111 that are activated by the finger 105.

In some embodiments the sub-image is recorded from multiple spaced apart regions scattered across the entire sensor area or an area thereof considered being 'active', wherein active means that it is operable to effectively sense a touch. In some embodiments the sub-image is selected from the entire sub-area or from multiple spaced apart regions of the sub-area, wherein the sub-area is selected as that portion whereat the touch occurred, wherein the portion is e.g. that half or another fraction of the sensor area where at the touch occurred.

Turning to the right hand side, which may represent the touch at a later point in time than illustrated by the left hand side (e.g. 2 to 50 milliseconds later), the groups of sensor elements designated 114 are activated by the finger 105 and outputs e.g. a binary '1'. As can be seen, the groups 114 form a larger set than the groups 111. At this point, the subarea 113 may be maintained as the area from which another one or more sub-image(s) is/are acquired. Alternatively, the sub-area may be moved to a position about a newly computed geometrical centre which yields an updated position 117 of the touch.

The subarea 116 shows how another sub-image may be relocated and expanded relative to 113 such that the other sub-image is selected from another region. Area 115 shows another way of how another sub-image may be expanded relative to 113 such that the other sub-image is selected from another region.

Figure 2:
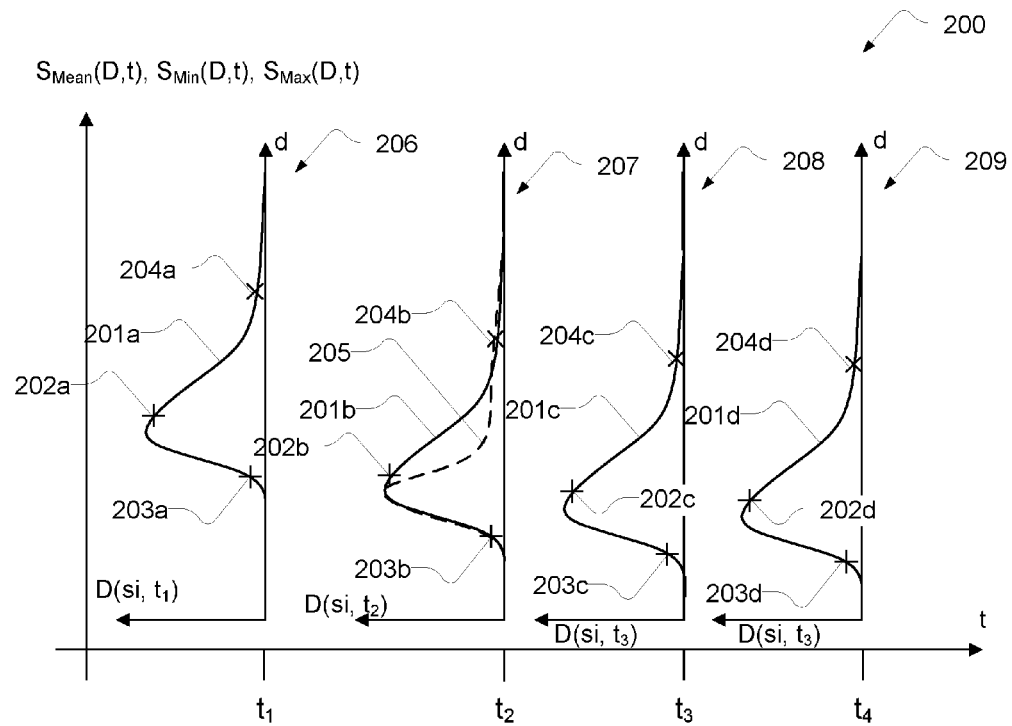
FIG. 2 shows distributions of image intensity values at different points in time and statistical values computed therefrom.

FIG. 2 shows distributions of image intensity values at different points in time and statistical values computed therefrom. It is assumed that appropriate normalisation is applied, albeit the curves shown are simplified.

In general the points in time are designated $t_1$, $t_2$, $t_3$ and $t_4$ and are shown along the abscissa axis designated 't' for time in a main coordinate system 200. Along the ordinate axis of the main coordinate system 200 the statistical indicators $S_{Mean}(D,t)$, $S_{Min}(D,t)$, $S_{Max}(D,t)$ are plotted, wherein D is the distribution of intensity values for a sub-image acquired at time t.

The main coordinate system comprises four sub-coordinate systems designated 206, 207, 208 and 209. The abscissa axis of each sub-coordinate system is designated d and represents values for sub-images. In some embodiments d corresponds to bins in the (normalized) histogram of the sub-images. The ordinate axis of each sub-coordinate system is designated D(si, t), wherein D designates density as a function of the sub-image, si, acquired at time t and the histogram bin. In some embodiments D(si, t) designates the (normalized) histogram frequency as a function of the sub-image, si.

The distributions are designated 201a, 201b, 201c and 201d and would generally be represented by discrete values. As shown the distributions have a similar shape, but are shifted relative to each other towards generally lower values.

However, as shown by distribution 205 (dashed line) the shape of the distribution may change from one sub-image to a next one.

The statistical indicators $S_{Mean}(D,t)$, $S_{Min}(D,t)$, $S_{Max}(D,t)$ measures the mean 202a, 202b, 202c and 202d, of the distribution and a minimum value 203a, 203b, 203c and 2031d and a maximum value 204a, 204b, 204c and 204d thereof. The crosses pointed to by the reference numerals indicate the values of the indicators when projected to the respective abscissa axes of the sub-coordinate systems or when projected to the abscissa axis of the main coordinate system.

The statistical indicator for the minimum values may be configured to represent a lower 'quantile' of the distribution e.g. the 5% percentile. In some embodiments this can be done by identifying the lowermost bin having a value that is closest to a certain percentile, e.g. 5% percentile, of the (normalized) histogram distribution. Similarly, the statistical indicator for the maximum values may be configured to represent an upper 'quantile' of the distribution, e.g. the 95% percentile. In one embodiment this can be done by identifying the uppermost bin having a value that is closest to a certain percentile, e.g. the 95% percentile, of the (normalized) histogram distribution.

As a general note, the points in time $t_1$, $t_2$, $t_3$ and $t_4$ represent points in time at which the following steps are performed:
  i) A respective sub-image is acquired,
  ii) The one or more statistical indicators are computed, and
  iii) The statistical indicators are evaluated for the purpose of determining the right point in time for acquiring a full image.

Thus points in time $t_1$, $t_2$, $t_3$ and $t_4$ represent, in a consistent way, some point in time during or at the beginning or completion of the above steps. In between the marked points in time one or more of the above steps are performed. Typically, it is prioritized to acquire sub-images as close in time as possible.

The above steps may be performed sequentially or concurrently; for instance sub-images may be acquired successively while computation of a statistical indicator is performed such that sub-image N+1 is acquired while computation of a statistical indicator for image N is computed.

Other statistical indicators may be used without departing from the scope of the invention.

Figure 3:
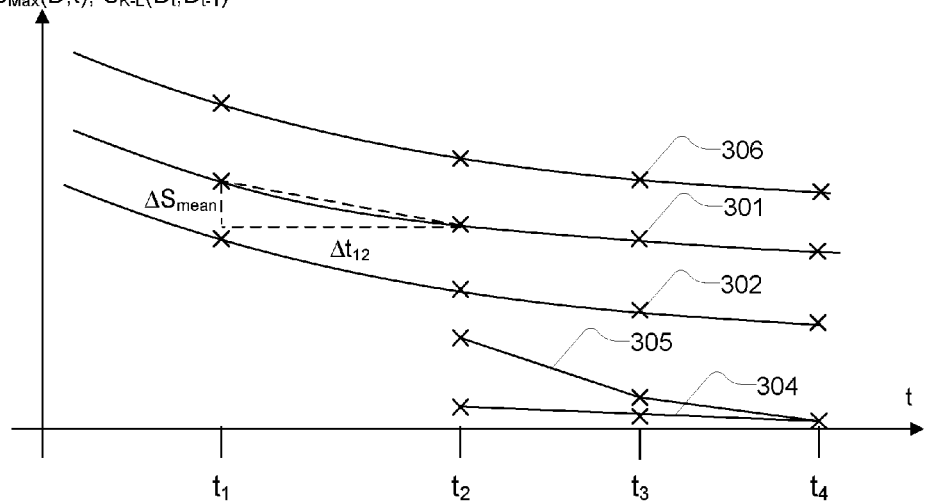
FIG. 3 shows temporal aspect of the statistical values.

FIG. 3 shows temporal aspect of the statistical values. The statistical values are computed by the statistical indicators $S_{Mean}(D,t)$, $S_{Min}(D,t)$, $S_{Max}(D,t)$ e.g. as described above. Additionally, the statistical values comprise values computed by the so-called Kullback-Leibler divergence measure, $S_{K-L}(D_t, D_{t-1})$, wherein $D_t$ designates the distribution at time t. Alternatively, computed as $S_{K-L}(D_{t-1}, D_t)$.

It is acknowledged that discrete values are computed, but continuous curves are drawn to more clearly show that the discrete values progress towards a stable state or stable level.

Values of $S_{Mean}(D,t)$, $S_{Min}(D,t)$, and $S_{Max}(D,t)$ are illustrated by respective crosses on the respective lines that pass the respective crosses pointed to by reference numeral 301, 302 and 306.

In an embodiment, a predefined criterion that indicates that the values of the statistical indicator have reached or is about to reach a stable state is that the slope of one or more of the indicators is below a slope threshold. The slope threshold may be estimated from experiments. As an example, the slope for $S_{Mean}$ is computed by taking the difference between values of $S_{Mean}$ at two points in time and dividing by the duration of the period between the two points in time.

The curve 304 illustrates a curve with a small slope of values from the Kullback-Leibler divergence measure. The curve is substantially flat when the distributions 201a, 201b, 201c and 201d are substantially similar or identical. In some embodiments the so-called Jensen-Shannon divergence measure is used additionally or alternatively. The Jensen-Shannon divergence is a symmetrized and smoothed version of the Kullback-Leibler divergence cf. e.g. Nielsen, F., "A family of statistical symmetric divergences based on Jensen's inequality." arXiv:1009.4004v2.

The curve 305 illustrates a curve of decreasing values from the Kullback-Leibler divergence measure when the histogram 205 replaces the histogram 201b.

One or more of the above-mentioned statistical indicators may be evaluated against respective criteria, the outcome of which are subsequently collective evaluated to decide whether a stable state is reached or is about to be reached or has been reached. In some embodiments, the one or more criteria have to be fulfilled over multiple points in time at which sub-images are acquired.

In some embodiments, wherein the normalized histogram is used as an estimate of the density distribution, D, it is ensured that the histogram bins are non-empty (i.e. density larger than zero) prior to the computation of the Kullback-Leibler divergence measure.

In another embodiment of invention, empty histogram bins is assigned/overwritten with an artificial value, such that these bins are no longer empty. Based on this modified histogram, a new density estimate can be made, and this is used in the Kullback-Leibler divergence measure.

Figure 4:
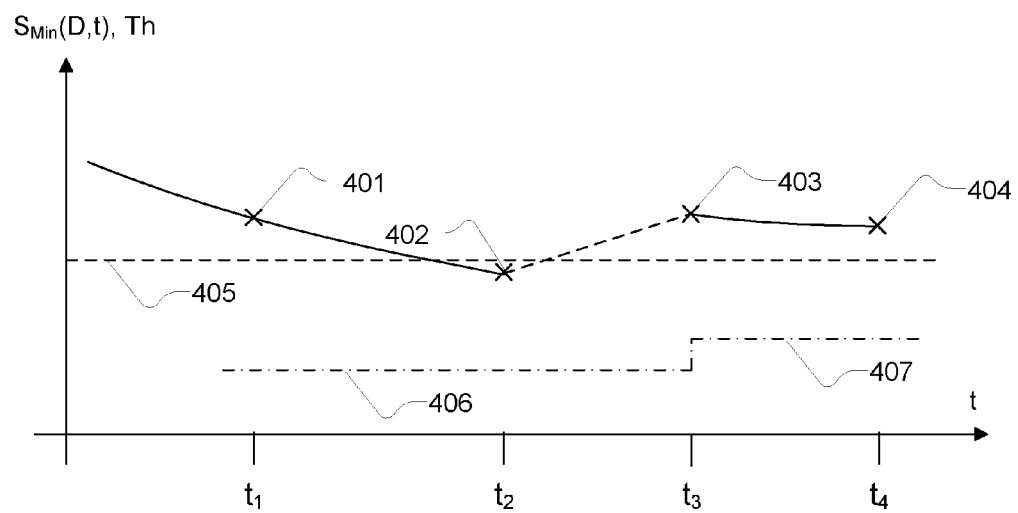
FIG. 4 shows temporal aspect of statistical minimum values and threshold levels.

FIG. 4 shows temporal aspect of statistical minimum values and threshold levels. The above-mentioned points in time, $t_1$, $t_2$, $t_3$ and $t_4$ are marked along the abscissa axis designated 't' for time. Along the ordinate axis values the statistical indicator $S_{Min}(D,t)$ mentioned above are plotted as shown by crosses 401, 402; and 403, 404. Also, threshold levels Th are plotted along the ordinate axis; here shown by dashed lines.

A threshold level of a criterion for $S_{Min}(D,t)$ is shown by a dashed line 405.

A shift in a threshold level for a criterion for evaluating the slope of e.g. $S_{Mean}(D,t)$ e.g. by $\Delta S_{Mean}/\Delta t$ is shown by a first threshold 406 that is shifted to a second threshold level 407. $\Delta S_{Mean}$ represents the difference in $S_{Mean}$ at time $t_n$ and $S_{Mean}$ at time $t_{n+1}$, and $\Delta t$ is the time difference $t_{n+1} - t_n$.

At time $t_1$ a value 401 of $S_{Min}$ is above the threshold level 405. This state indicates that the sub-image recorded at $t_1$ is not saturated. However, when a succeeding sub-image is acquired at $t_2$ a value 402 of $S_{Min}$ computed from a succeeding sub-image is below the threshold level 405. This state indicates that the sub-image recorded at $t_2$ is close to saturation or has been saturated (here low intensity values in the sub-images indicates high signal strength, i.e. high signal strength). Thus, values of the statistical indicator $S_{Min}$ are evaluated over time, as the values are computed, against an intensity threshold. Then, when values of the statistical indicator exceeds the intensity threshold (here shown by falling below the threshold), there is performed an adjustment of a setting of the fingerprint sensor. The setting may e.g. be one or more of a DC shift (offset), a gain setting etc. This is described in more detail further below.

As an effect of adjusting the setting of the fingerprint sensor, the value 403 of $S_{Min}$ computed from the succeeding sub-image at $t_3$ has moved to a higher value—above the threshold level 405—and back into a state wherein the image is not saturated (or close to saturation). As shown by the value 404 the effect of the adjustment lasts for the sub-image acquired at $t_4$. Thereby adaptive control of the operating conditions for the fingerprint sensor is provided. In this embodiment the adaptive adjustment is triggered by values of a statistical indicator exceeding a threshold. From experiments this strategy appears to be sufficient, however, finer and/or more frequent adjustments may be envisioned.

As mentioned further above, the slope of e.g. $S_{Mean}$ may be used as indicator for deciding when a stable state of the sub-images is reached such that acquisition of a full fingerprint image can commence. The slope is e.g. evaluated against a threshold, e.g. denoted a slope threshold. However, since the evaluation of the slope extends from one sub-image to another over one or more time periods e.g. $t_1$ to $t_2$ and $t_2$ to $t_3$ etc. it is not optimal to evaluate the slope against a fixed threshold level across an adjustment of the settings or operating conditions of the fingerprint sensor. For instance the values 401, 402, 403 and 404 may indicate a progress towards a stable state, but only when taking the effect of the adjustment into account.

In one embodiment, the threshold for evaluating the slope is shifted in accordance with an adjustment of the settings of the fingerprint sensor e.g. as shown by the shift in threshold level for evaluating the slope as shown by a first threshold 406 that is shifted to a second threshold level 407.

In connection therewith it should be noted that the effect of a change in the gain and/or shift setting or other setting or settings can be taken directly or indirectly into account when the statistical indicators are computed and evaluated.

In other embodiments the change can be taken into account indirectly is by skipping computation of a slope of a statistical indicator spanning point(s) time when a setting is changed or takes effect, and/or by skipping or ignoring evaluation of the statistical indicator (e.g. slope) when computed from point(s) time when a setting is changed or takes effect for the first time.

An example where the effect of a change in setting is taken into account directly when computing the delta change of the statistical indicator is as follows:

If it is known that a change in the gain level approximately will lead to a change in the statistical indicator S(t) by the factor α at time instance t, this could be taken into account by either:
  i) $\Delta \hat{S}(t) = S(t) - \alpha S(t-1)$
  ii) or by
  iii) $\Delta \hat{S}(t) = S(t)/\alpha - S(t-1)$.

If it is known that the change in shift level will offset the statistical indicator S(t) at time t by β, it could be taken into account in the estimate of the delta change by subtracting β in the delta change estimate, i.e.
  i) $\Delta \hat{S}(t) = S(t) - \beta - S(t-1)$.

In the case where there the statistical indicator S(t) at time t will be changed by factor α (e.g. due to gain change) and offset by β (e.g. due to a shift change) this can be compensated by
  i) $\Delta \hat{S}(t) = S(t) - \beta - \alpha S(t-1)$
  ii) or by
  iii) $\Delta \hat{S}(t) = (S(t) - \beta)/\alpha - S(t-1)$.

Other ways of computing compensation are possible and the above is included as examples only.

Figure 5:
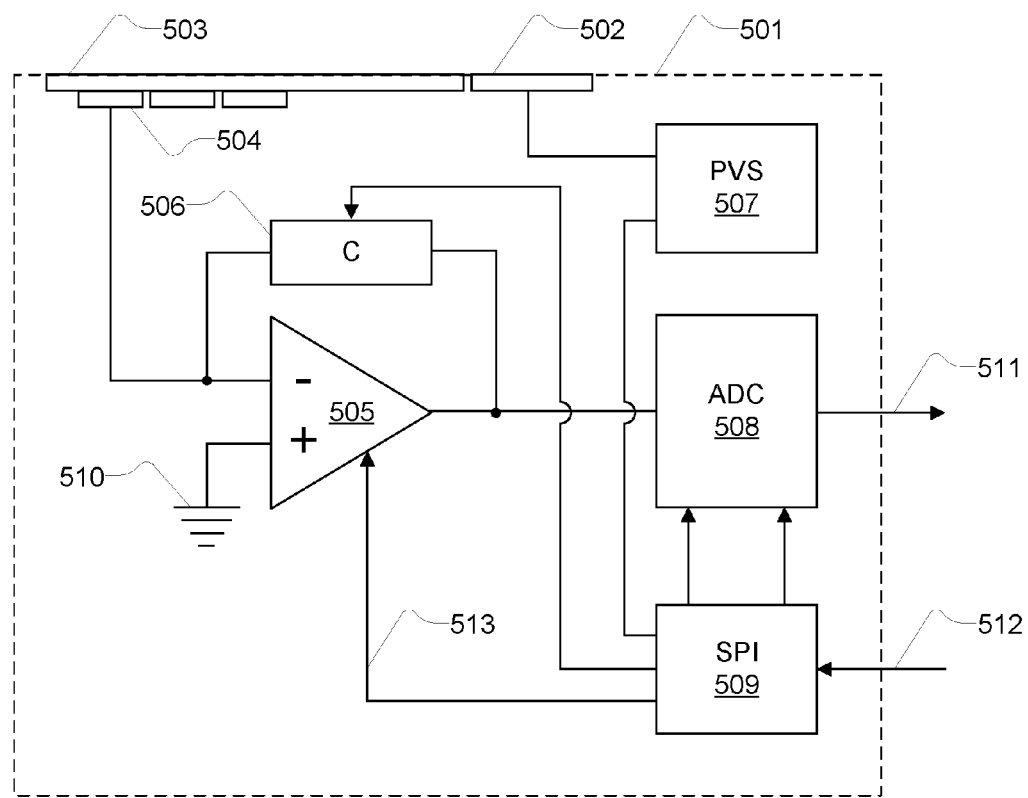
FIG. 5 shows a controllable fingerprint sensor for acquiring fingerprint images.

FIG. 5 shows a controllable fingerprint sensor for acquiring fingerprint images. Such a fingerprint sensor, generally designated 501, makes it possible to perform adjustment of its settings e.g. adaptively as mentioned above and are known in the art. Here, the fingerprint sensor 501 is shown with some of its components left out. For instance only circuitry for one sensor element (pixel) is shown and multiplexing circuitry for reading out intensity values from the respective sensor elements of the array of sensor elements is omitted. It should be noted that many different configurations of a controllable fingerprint sensor are foreseeable.

The fingerprint sensor 501 comprises a bezel 502 e.g. in the form of a rim of a metal arranged to surround sensor elements in the array and to provide electrical charge to a finger touching or immediately about to touch the array of sensor elements. The electrical charge is provided by a programmable voltage source 507, which is controlled via a serial programmable interface, SPI, 509 e.g. to supply one or more predefined levels of voltage (also denoted a finger drive signal) to the bezel 502. Alternatively, the bezel may be coupled to a ground connection and the finger drive signal may be applied to change a voltage reference level of the integrated circuit forming the fingerprint sensor.

The serial programmable interface, SPI, 509, serves as an interface through which settings of the fingerprint sensor 501 can be set from a device coupled to the SPI, 509 via a serial bus 512. The device may be a programmed computer or dedicated hardware device. Thereby the operating conditions of the fingerprint sensor can be set.

Sensor elements each comprises a metal plate generally designated 504 that are organised as cells in a grid or matrix layout of e.g. 64×256 cells. Each sensor element comprises a charge amplifier e.g. configured as an operational amplifier 505 coupled with a feedback network 506 of capacitors and switches that are controlled via the SPI 509 for changing e.g. gain setting of the charge amplifier. Also, a DC shift of the charge amplifier can be set from the SPI, 509 via a connection 513. The DC shift may be set via an adjustable DC voltage source (not shown) coupled between the ground connection 510 and the non-inverting input (+) of the amplifier 505. This is generally known in the art.

The charge amplifier is coupled at its non-inverting input (+) to a ground connection 510 and the feedback network 506 is coupled between the output of the operational amplifier 505 and its inverting input (−). The output of the operational amplifier 505 and thus the charge amplifier is coupled to an analogue-to-digital amplifier ADC, 508 which in turn supplies a digital output signal 511 via a bus e.g. to a device as mentioned above.

The analogue-to-digital amplifier ADC, 508 is also coupled to SPI, 509 for setting one or more of gain or shift in the ADC, 508.

Thus, albeit the multiplexing circuitry has been omitted here for simplicity there is provided a signal path for reading out digital values from each sensor element in the array of sensor elements such that a fingerprint image can be formed.

Sub-images can be read-out by limiting read-out to predefined rows or columns of the array or a combination thereof. In some embodiments read-out can controlled via the SPI, 509 to start at a certain row position and column position in the array and to proceed across a number of rows and columns to thereby select a sub-image from a predefined region or sub-area. It should be noted that the hardware configuration of the fingerprint sensor may impose certain limitations in this respect.

For the purpose of monitoring groups of sensor elements located at group-wise spaced apart positions in the array of sensor elements and for determining the location of a touch event occurring on the array of sensor elements, there is provided an additional signal path for reading out digital values from sensor elements. The additional signal path (not shown) is optimized for fast read-out of a value e.g. a single-bit value representing the electrical charge on a group of metal plates. Additional circuitry may be provided for this purpose. In some embodiments the additional signal path runs from a group of plates 504 e.g. from a group of 4-by-4 or 8-by-8 plates or from the outputs of a group of charge amplifiers to the bus 511 or to an additional bus. This is known in the art.

Please note that persons in the art sometimes denote the plate 504 and the charge amplifier circuitry 'a pixel'. In this respect the ADC 508 is shared by multiplexing for a group or block of pixels, e.g. a row or column of pixels in the array.

Figure 6:
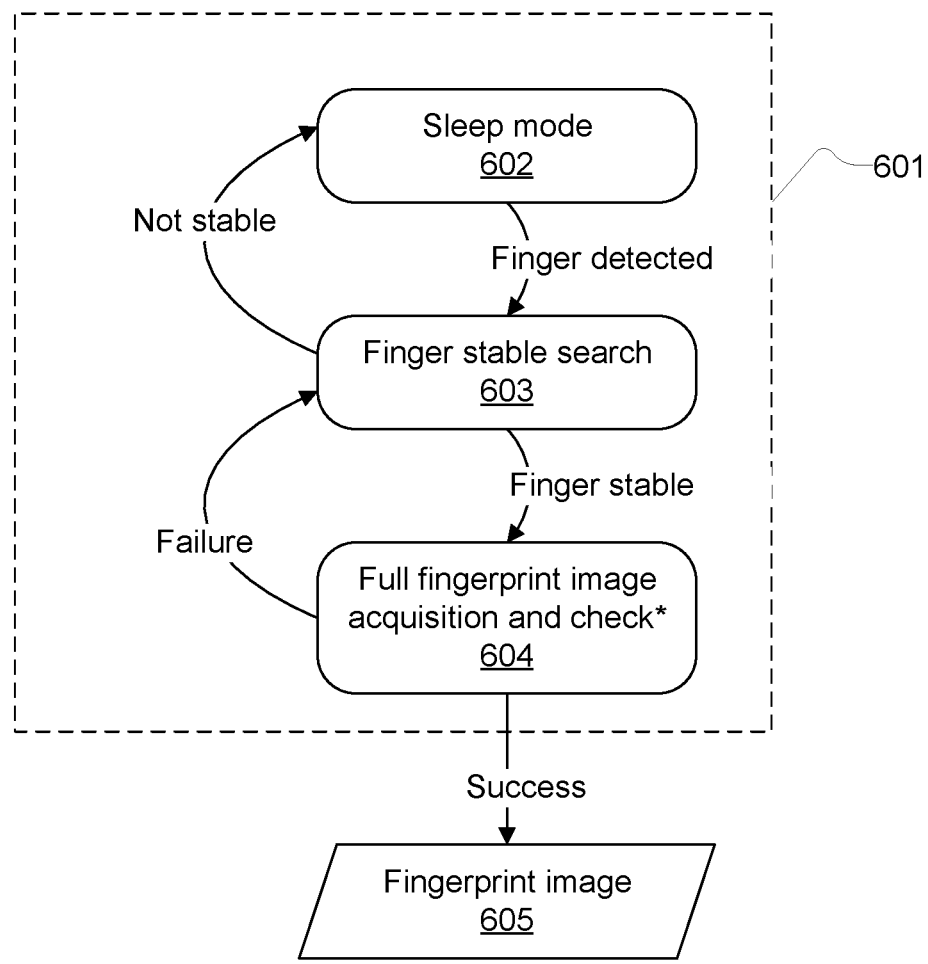
FIG. 6 shows an state diagram on a general level for software based finger stable detection.

FIG. 6 shows a state diagram on a general level for software based finger stable detection. The state diagram shows states, enclosed by the dashed-line box 601, of the software based detection which outputs a full fingerprint image 605. However, it should be noted that it may apply for a hardware implementation as well.

In a first state designated 'sleep mode', 602 the processor running the software and/or hardware based finger stable detection is in a low-power mode e.g. a sleep mode wherein pads or groups of sensor elements located at group-wise spaced apart positions in the array of sensor elements are monitored. When more than a threshold number of pads indicate a touch, it is determined that a finger is detected and a transition to a second state designated 'finger stable search', 603 is performed whereby the sleep mode is leaved.

While in the 'finger stable search', 603 sub-images are acquired and processed as described in more detail further below and as illustrated above. In case processing of sub-images doesn't result in a stable state being determined and a termination criterion is satisfied, the touch is considered 'not stable' and a transition back to the sleep mode, 602 is performed. A termination criterion may be that a time-out is reached e.g. started at the point in time when a first sub-image is acquired, or when a threshold number of sub-images have been acquired without a stable state being identified or when a statistical indicator exceeds a predefined criterion indicating a non-convergence towards a stable state.

In the alternative event, that a stable state is reached, a transition to state 604 designated "full fingerprint image acquisition and check*" is made. In this state a full fingerprint image is acquired. Optionally, as indicated by the asterisk *, a check of the quality of the full fingerprint image is performed.

In case the quality check is not performed, the full fingerprint image 605 is provided unconditionally (all other things being equal).

In case the quality check is performed, the full fingerprint image is provided conditioned on a successful outcome 'Success' of the quality check. In some embodiments the full fingerprint image is provided in any event (all other things being equal) but is assigned with a value indicating the outcome of the quality check.

If the outcome of the quality check is that the quality is significantly degraded, designated as 'failure', a transition from state 604 to state 603 is performed optionally comprising a step of prompting a user to repeat his/hers touch.

Figure 7:
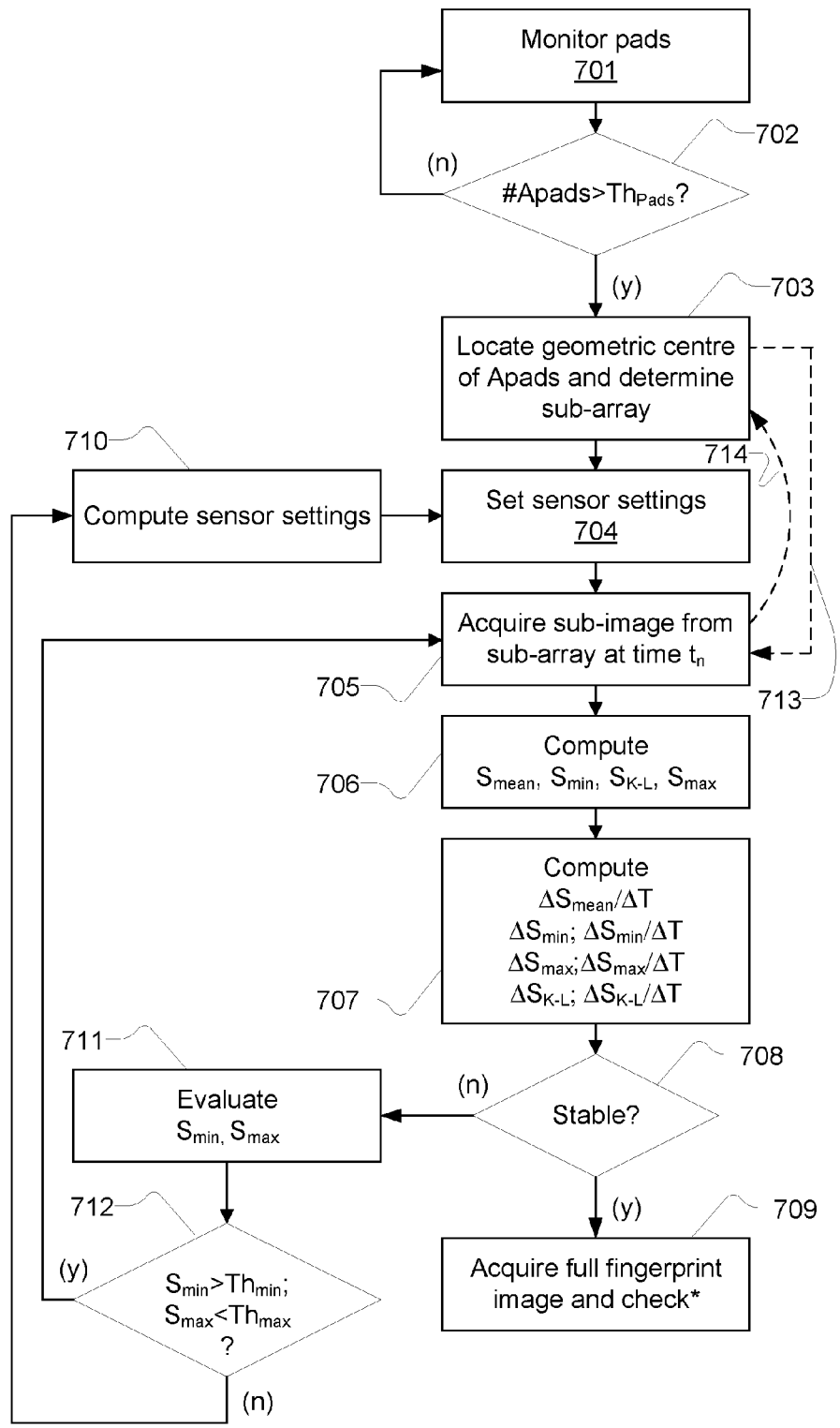
FIG. 7 shows a flowchart for a software-based finger stable detection and fingerprint image acquisition.

FIG. 7 shows a flowchart for software based finger stable detection and fingerprint image acquisition.

The method starts in step 701 and proceeds to step 702, while the processor performing the method is in a sleep mode, by monitoring pads of the fingerprint sensor. Pads that output a signal indicating a touch forms a set of pads designated Apads. The size of the set is designated $\#A_{pads}$ and until the size of the set exceeds a threshold designated $Th_{pads}$ the method loops back (n) to step 701. Then, when the size of the set exceeds $Th_{pads}$ threshold (y), the method proceeds to step 703 wherein a geometrical centre of the set of pads is determined.

Then, in step 704 settings for the fingerprint sensor are set. At a first run of the method, step 704 may set default settings. In some embodiments the settings of the sensor are not changed and the method may proceed from step 703 to step 705 as indicated by the dashed line 713.

Then, in step 705 a sub-image is selected and acquired at time $t_n$, as described above, wherein subscript n designates a discrete point in time.

When the sub-image is acquired from the fingerprint sensor, statistical indicators are computed as described above; the indicators may comprise a mean value of intensity values in the sub-image, a minimum and/or maximum value thereof as described above or a lower and/or upper quantile or the Kullback-Leibler divergence measure. In one embodiment the Jensen-Shannon divergence could be used as an alternative to the Kullback-Leibler divergence measure. The indicators are stored and designated $S_{mean}$, $S_{min}$, $S_{K-L}$, $S_{max}$, respectively.

Then, in step 707 slopes of the above-mentioned indicators are computed and stored; they are computed as follows: $\Delta S_{mean}/\Delta t$; $\Delta S_{min}/\Delta t$; $\Delta S_{max}/\Delta t$ and $\Delta S_{K-L}/\Delta t$ wherein $\Delta t$ is the duration of the period from acquisition of one sub-image to the next (confer above). In some embodiments $\Delta t$ is a fixed duration. In other embodiments $\Delta t$ is computed for each slope value because the time it takes to acquire a sub-image may vary or for other reasons.

Based on an evaluation of how one or more of the slopes develops, a decision is made in step 708 on whether a stable state is reached (y) or whether a stable state is not, yet, reached (n).

In case a stable state is reached (y), which typically happens after multiple iterations, a full fingerprint image is acquired in step 709. As described above this may involve an optional step of performing a check as will be described in more detail further below.

In the alternative, in the case a stable state is not reached yet, a computation and evaluation of the statistical indicators $S_{min}$ and $S_{max}$ are performed in steps 711 and 712. Step 712 is performed to evaluate how the dynamic range of the fingerprint sensor is used. In case the values read out from the fingerprint sensor clumps e.g. at minimum values or at maximum values it is hard if not impossible to derive sensible information about the fingerprint at least for authorization purposes. Therefore, the evaluation is performed in step 712 based on the values computed in step 711. $S_{min}$ is evaluated against a threshold $Th_{min}$ and $S_{max}$ is evaluated against a threshold $Th_{max}$. Thus, the criteria are: $S_{min} > Th_{min}$ and $S_{max} < Th_{max}$. The criteria may be evaluated by a logical 'and' operator.

In case both criteria are satisfied (y) a further sub-image is acquired with the same or substantially the same settings as set in step 704 during a previous iteration. In case one or both criteria are not fulfilled (n) the method proceeds to step 710 where sensor settings are computed based on one or more of the statistical indicators e.g. based on one or more of $S_{mean}$, $S_{min}$ and $S_{max}$.

In some embodiments the sub-images are acquired from one or determination of the location of the touch, but at the same location. In other embodiments, the sub-images are acquired at different locations. In the latter type of embodiments, step 703 is performed after step 705 but before the sub-image is acquired in step 705 to determine wherefrom the next sub-image is to be acquired. This route of the method is shown by dashed line 714.

As mentioned above, fingerprint sensors may offer different settings such as one or more of charge amplifier gain, charge amplifier shift (offset), an ADC gain, an ADC analogue and/or digital shift; the finger drive signal, control of the size of the sensor plate by switching etc. It should be noted that adjusting the finger drive signal in effect changes the gain and may, to some extent, change the shift. Thus, there are different respective methods of computing the settings. In general the method aims at recording a next sub-image at a better quality (with more information) than a previous sub-image.

As mentioned above, a termination criterion (not shown) may be applied to prevent the method for being stuck in trying to reach a stable state that is not reachable e.g. because the finger is removed from the sensor.

Figure 8:
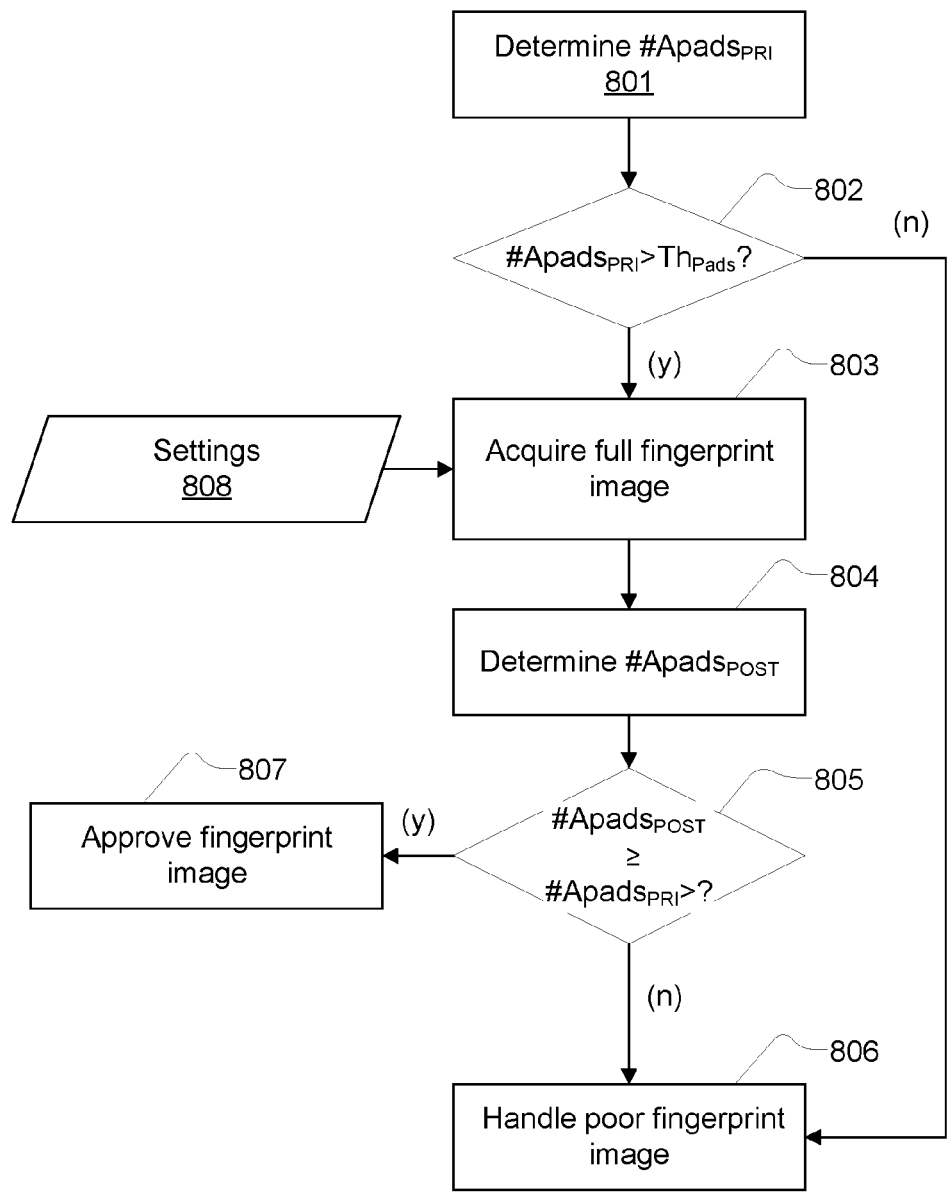
FIG. 8 shows a flowchart for evaluating the quality of a full fingerprint image.

FIG. 8 shows a flowchart for evaluating the quality of a full fingerprint image. This flowchart illustrates how the optional quality check of the full fingerprint image can be estimated. Once the finger is determined to be stable on the sensor as determined in step 708 (y) the method proceeds to step 709, which may be performed as follows:

In step 801 pads that output a signal indicating a touch forms a first set of pads that is determined and designated $Apads_{PRI}$. The size of the set is designated $\#Apads_{PRI}$. In step 802 a first test is made, by evaluating whether the size of the set is larger than the $Th_{pads}$ threshold. If the negative event thereof (n) the method proceeds directly to step 806, wherein further steps are performed to handle the situation that may be caused by the finger being lifted just as it was determined to be stable. Step 806 may comprise steps to prompt the user to try again to touch the sensor; optionally with a message indicating that a slower touch should be applied.

If the positive event (y) of step 802, a full fingerprint image acquisition commences using settings 808 (computed in step 710) and completes in step 803. Thereafter, or even during the process of acquiring a full fingerprint image, step 804 determines a second set of pads designated $Apads_{POST}$. The size of this second set is designated $\#Apads_{POST}$. In some embodiments settings 808 are default settings or settings computed in another way.

The second set or its size is compared to the first set or its size by the statement: $\#Apads_{POST} \geq \#Apads_{PRI}$ in step 805. In case the statement is true (y), it appears that the finger is still stable on the sensor and the full fingerprint image is approved in step 807 e.g. by assigning a value to the image indicating that its quality is approved.

On the contrary, if the statement is false (n) step 806 described above is performed also in this event.

First Aspect of Quality Evaluation:

There is also provided a method of acquiring a fingerprint image from a fingerprint sensor with an array of sensor elements spanning a sensing area, comprising:

determining a first point in time of when to start acquisition of a first fingerprint image spanning a first area of the sensing area;

at the first point in time, starting acquisition of the first fingerprint image and continuing acquisition of the fingerprint image by reading out image information from the fingerprint sensor during a period of time;

characterized in that:

following the period of time, during which acquisition of a first fingerprint image is performed, acquiring a first sub-image, which covers a first sub-area of the first area of the sensing area;

selecting a second sub-image, which also covers the first sub-area of the first area of the sensing area, from the first fingerprint image;

computing first values of a statistical indicator from the first sub-image and computing second values of the statistical indicator from the second sub-image;

comparing the first values and the second values; and assigning a value to the fingerprint image, wherein the value indicates an outcome of comparing the first set and the second set.

Consequently, an efficient way of performing quality control of the acquired first fingerprint image, which may be a complete or full fingerprint image, is provided. Since the first fingerprint image and the first sub-image are acquired at different points in time and during respective periods of time, there is acquired information at two different points in time for deciding whether the finger touched the sensor in a stable way throughout at least the last portion of the period during which the first fingerprint image is acquired. Thus, should a finger not be stable throughout acquisition of a full image it is thereby possible to catch that situation by comparing the first values and the second values computed from the first sub-image and the second sub-image, respectively.

The locations of the first sub-image and the second sub-image are the same or substantially the same i.e. they are acquired from the same subarea or substantially the same subarea. In some embodiments the location is selected to be from a position in the array that is read out relatively early in the period of time, during which acquisition of a first fingerprint image is performed; e.g. in the first half of the time period or in the middle of the time period.

Second Aspect of Quality Evaluation:

There is also provided a method of acquiring a fingerprint image from a fingerprint sensor with an array of sensor elements spanning a sensing area, comprising:

from the array of sensor elements, acquiring, at least at a third point in time, a first fingerprint sub-image which is confined in size to a first subarea of the sensing area;

determining a first point in time of when to start acquisition of a first fingerprint image spanning a first region of the sensing area; wherein the first point in time is later than the third point in time;

at the first point in time, starting acquisition of the first fingerprint image and continuing acquisition of the fingerprint image by reading out image information from the fingerprint sensor during a period of time;

characterized in that:

following the period of time, during which acquisition of the first fingerprint image is performed, acquiring a second sub-image, which is confined in size to the first sub-area;

computing first values of a statistical indicator from the first sub-image and computing second values of the statistical indicator from the second sub-image;

comparing the first values and the second values; and assigning a value to the fingerprint image, wherein the value indicates an outcome of comparing the first set and the second set.

Consequently, information for evaluating the quality of the first fingerprint image, which may be a full or complete fingerprint image, can be provided immediately before and immediately after acquisition of the first fingerprint image. There is thus acquired information at two different points in time for deciding whether the finger touched the sensor in a stable way throughout the period during which the first fingerprint image is acquired. Thus, should a finger not be stable throughout acquisition of a full image it is thereby possible to catch that situation by comparing the first values and the second values computed from the first sub-image and the second sub-image, respectively.

Third Aspect of Quality Evaluation:

There is also provided a method of acquiring a fingerprint image from a fingerprint sensor with an array of sensor elements spanning a sensing area, comprising:

from the array of sensor elements, acquiring, at least at a third point in time, a first fingerprint sub-image which is confined in size to a first subarea of the sensing area;

determining a first point in time of when to start acquisition of a first fingerprint image spanning a first region of the sensing area; wherein the first point in time is later than the third point in time;

at the first point in time, starting acquisition of the first fingerprint image and continuing acquisition of the fingerprint image by reading out image information from the fingerprint sensor during a period of time;

characterized in:

selecting a second sub-image, which also covers the first subarea of the first region of the sensing area, from the first fingerprint image;

computing first values of a statistical indicator from the first sub-image and computing second values of the statistical indicator from the second sub-image;

comparing the first values and the second values; and assigning a value to the fingerprint image, wherein the value indicates an outcome of comparing the first set and the second set.

The locations of the first sub-image and the second sub-image are the same or substantially the same i.e. they are acquired from the same subarea or substantially the same subarea. In some embodiments the location is selected to be from a position in the array that is read out relatively late in the period of time, during which acquisition of a first fingerprint image is performed; e.g. in the last half of the time period or in the middle of the time period.

Fourth Aspect of Quality Evaluation

There is also provided a method of acquiring a fingerprint image from a fingerprint sensor with an array of sensor elements spanning a sensing area, comprising:

monitoring groups of sensor elements located at group-wise spaced apart positions in the array of sensor elements to detect a touch; and acquiring a fingerprint image;

characterized in that:

before or upon start of acquisition of a full fingerprint image, determining a first set of groups of sensor elements that indicate a touch;

upon completion of acquisition of a full fingerprint image or at a point in time when the fingerprint image is acquired, determining a second set of groups of sensor elements that indicate a touch;

comparing the first set of groups of sensor elements and the second set of groups of sensor elements; and assigning a value to the fingerprint image, wherein the value indicates an outcome of comparing the first set and the second set.

Consequently, an efficient way of performing quality control of the acquired full fingerprint image is provided. There is also provided an apparatus and a computer system configured to perform the method.

The fingerprint image may be a full fingerprint image or a substantially full fingerprint image such as a fingerprint image acquired from a majority of or substantially all sensor elements of the fingerprint sensor e.g. from more than 75% or more than 80% of the sensor elements.

The point in time at which acquisition of the fingerprint image commences may be determined by a one or more of the below criteria:
a) At the end of a time period, such as a fixed time period, running from a point in time at which a touch is determined to occur e.g. when at least a first threshold number of groups of sensor elements indicates a touch;
b) When a statistical indicator reaches a stable state e.g. a statistical indicator computed from sub-images as disclosed in much greater detail above;
c) Immediately following a point in time when a second threshold number of groups of sensor elements indicates a touch;
d) Another criterion for determining when to acquire the fingerprint image.

The first threshold number of groups of sensor elements may be set lower than the second threshold number. The first threshold number may be set to trigger an early point in time when the finger typically 'lands' (touches down) the sensor, whereas the second threshold number may be set to trigger a later point in time when the finger typically 'has landed' (is touching) on the sensor in the sense that a larger number of groups of sensor elements indicate a touch.

In case of point b) above, the point in time at which the 'determining a first set of groups of sensor elements that indicate a touch' is performed may be at a point time when the statistical indicator indicates a stable state i.e. after acquisition of sub-images or at point time before or during acquisition of the sub-images, however after the location of a touch occurring on the array of sensor elements is determined.

As mentioned above, the fingerprint sensor may be configured to provide a very fast read-out of values indicating whether a pad or group of sensor elements is touched or not e.g. as a binary signal. Thus, the quality control can be performed in a fast way to quickly prompt the user to try again, in case the fingerprint image is of inferior quality.

In some aspects, in case the second set fails to comprise all or substantially all groups in the first set, the value assigned to the fingerprint image is set to indicate that the quality of the fingerprint image is inferior. In case the second set comprise all or substantially all or additional groups than the groups in the first set, the value assigned to the fingerprint image is set to indicate that the quality of the fingerprint image is approved.

By 'assigning a value to the fingerprint image' is understood that the fingerprint image itself may carry or be encoded with the value or that further steps of the method is controlled in response to the outcome of comparing the first set and the second set. In that latter situation, the control may take place e.g. by a first branch of the method handling an 'approved' fingerprint image and a second branch of the method handling a 'disapproved' fingerprint image. The first branch may comprise further processing of the fingerprint image e.g. for authentication and/or verification purposes and the second branch may comprise a step of prompting the user for an additional touch.

The above methods may be used in combination. For instance the methods in the first to fourth aspects above may be used with the methods of determining when to acquire a full fingerprint image disclosed above and/or the statistical indicators disclosed further above and/or other statistical indicators or methods.

Figure 9:
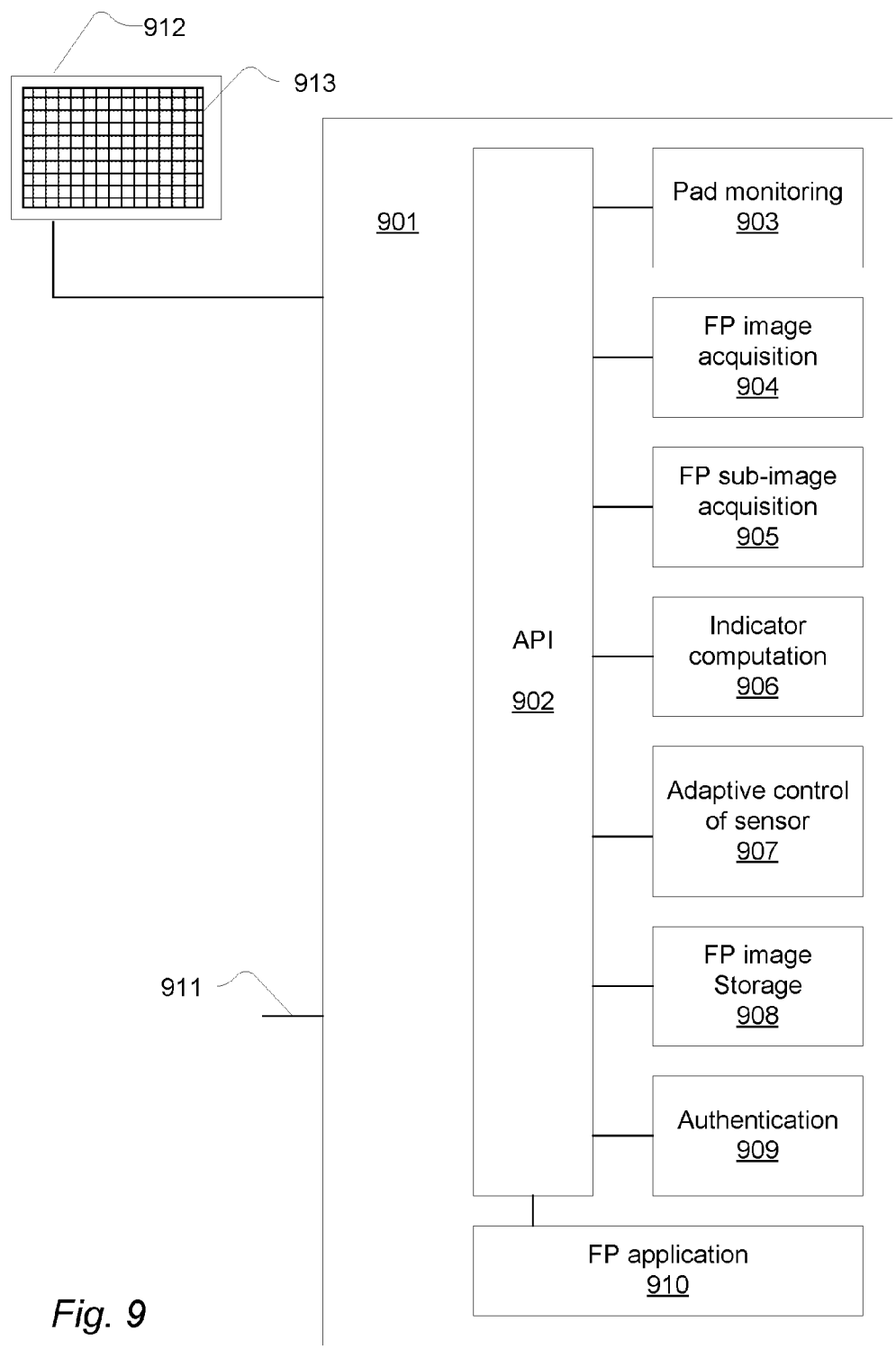
FIG. 9 shows components of a software based finger stable detection and fingerprint image acquisition system.

FIG. 9 shows components of a software based finger stable detection and fingerprint image acquisition system. The system comprises a processing unit 901 which may be a microprocessor dedicated to processing of fingerprint images or a central processing unit of for instance a mobile telephone which may dynamically scale its resource allocation to the method as required.

The processing unit 901 is in communication with a fingerprint sensor 912, which comprises a matrix 913 of sensing elements e.g. of the capacitive type as known in the art. The fingerprint sensor may comprise a serial programmable interface (not shown here) through which the processing unit 901 communicates with the fingerprint sensor 912 for acquiring fingerprint images sensed by it and for configuring the fingerprint sensor by communicating settings to it. The processing unit 901 runs software components on its hardware resources.

The software components comprise a pad monitoring component 903 which may run during a sleep mode to wake up the system when at least a threshold number of pads indicate a touch; a component 904 configured to acquire a full fingerprint image; a component 905 configured to acquire a sub-image at a predefined location and with a predefined size as described above; and a component 906 configured to compute the statistical indicators and slopes as described above.

The software components also comprise a component 907 configured to perform adaptive control of the fingerprint sensor by communicating settings to the sensor in response to an evaluation of a sub-image as described above; a storage 908 for storing one or more sub-images e.g. temporally and for storing a full fingerprint image; and an optional component 909 for performing fingerprint based authentication as it is known in the art.

The software components also comprise a fingerprint application 910 for controlling one or more of the above.

Acquisition of a fingerprint image may also be denoted capture of a fingerprint image.

In general, the method may be a computer-implemented method. The method or the computer-implemented method may be performed by one or both of a programmed computer and hardware such as a fingerprint sensor.

What is claimed is:

1. A method of acquiring a fingerprint image from a fingerprint sensor with an array of sensor elements spanning a sensing area, comprising:
   monitoring groups of sensor elements located at group-wise spaced apart positions in the array of sensor elements, to determine the location of a touch occurring on the array of sensor elements;
   from the array of sensor elements, acquiring, at respective points in time, fingerprint sub-images which are confined in size to a subarea of the sensing area; wherein one or more of the sub-images is/are selected from a location about the location of the touch;
   as the fingerprint sub-images are acquired, computing values of a statistical indicator for the fingerprint sub-images;
   acquiring a full fingerprint image when a predefined criterion indicates that the values of the statistical indicator have reached or are about to reach a stable state.

2. A method according to claim 1, wherein the location of a touch is estimated from those groups of sensor elements that indicate a touch, at a point in time, when at least a threshold number of groups of sensor elements indicates that the touch event is occurring.

3. A method according to claim 1, wherein the one or more of the sub-images is/are selected from a region confined in expanse to be within a bounding box enclosing the groups of sensor elements that indicates that the touch event is occurring.

4. A method according to claim 1, wherein the step of monitoring a set of groups of sensor elements, continues while the fingerprint sub-images are acquired to dynamically determine the subset of groups of sensor elements, and therefrom dynamically relocate from which sensor elements the preliminary fingerprint sub-images are acquired.

5. A method according to claim 1, comprising:
evaluating the slope of the values of the statistical indicator over time as the values are computed; wherein the predefined criterion indicates that the values of the statistical indicator has reached or is about to reach a stable state when the slope is below a predefined slope threshold.

6. A method according to claim 1, comprising:
adaptively performing an adjustment of a setting of the fingerprint sensor in response to values of an intensity measure computed from at least one of the fingerprint sub-images.

7. A method according to claim 1, comprising:
evaluating the values of one or both of the statistical indicator and a further statistical indicator over time, as the values are computed, against an intensity threshold;
when one or more of the values of one or both of the statistical indicator and a further statistical indicator exceed the intensity threshold, performing an adjustment of a setting of the fingerprint sensor.

8. A method according to claim 7, wherein the setting of the fingerprint sensor is adjusted by changing a gain setting in the fingerprint sensor.

9. A computer-implemented method according to claim 7, wherein the setting of the fingerprint sensor is adjusted by changing a shift setting in the fingerprint sensor.

10. A computer-implemented method according to claim 7, wherein one or both of the statistical indicator and the further statistical indicator is/are selected from the group of: a percentile or quantile of the distribution of intensity values; a median value, a mean value, a total variation distance, and a divergence measure, such as an asymmetrical or symmetrical divergence measure of the distribution relative to a predefined distribution.

11. A method according to claim 1, comprising:
before or upon start of acquisition of a full fingerprint image determining a first set of groups of sensor elements that indicate a touch;
upon completion of acquisition of a full fingerprint image or at a point in time when the full fingerprint image is acquired, determining a second set of groups of sensor elements that indicate a touch;
comparing the first set of groups of sensor elements and the second set of groups of sensor elements; and
assigning a value to the full fingerprint image, wherein the value indicates an outcome of comparing the first set and the second set.

12. A computer system loaded with a computer program configured to perform the method of claim 1.

13. A non-transitory computer-readable medium carrying a program configured to perform the method of claim 1 when the method is a computer-implemented method run on a computer.

14. An apparatus configured to acquire a fingerprint image from a fingerprint sensor with an array of sensor elements spanning a sensing area, comprising:
a monitoring component configured to monitor groups of sensor elements located at group-wise spaced apart positions in the array of sensor elements, to determine the location of a touch occurring on the array of sensor elements;
an image acquisition component configured to acquire, at respective points in time, fingerprint sub-images which are confined in size to a subarea of the sensing area; wherein one or more of the sub-images is/are selected from a location about the location of the touch;
a computing component configured to compute values of a statistical indicator for the fingerprint sub-images as the fingerprint sub-images are acquired;
wherein the image acquisition component is further configured to acquire a full fingerprint image when a predefined criterion indicates that the values of the statistical indicator have reached or are about to reach a stable state.

15. An apparatus according to claim 14, wherein the apparatus is one of a mobile phone, a smart phone, a tablet computer, a laptop computer and a general purpose computer.

* * * * *